July 24, 1962
L. LOMBARDI
3,045,738
TRACTION DEVICE
Filed Jan. 10, 1961
2 Sheets-Sheet 1
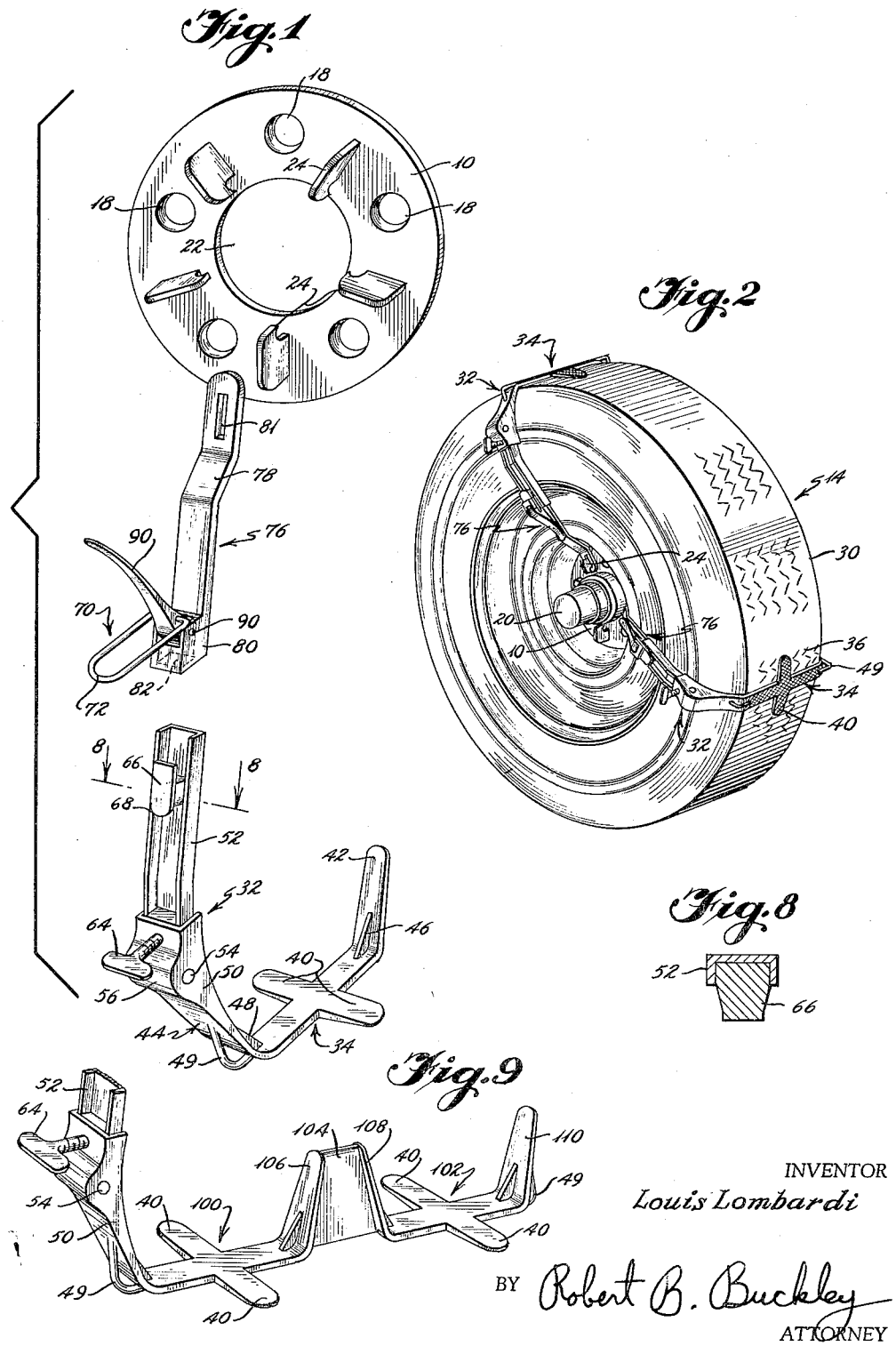
INVENTOR
Louis Lombardi
BY Robert B. Buckley
ATTORNEY

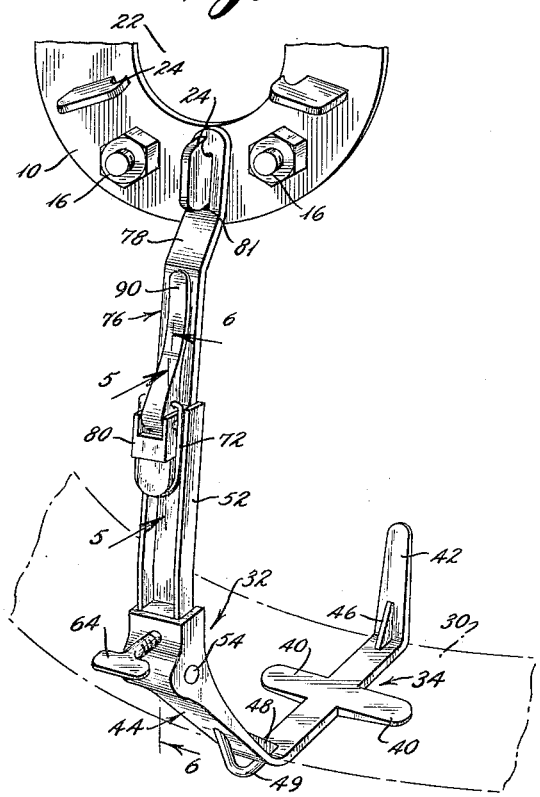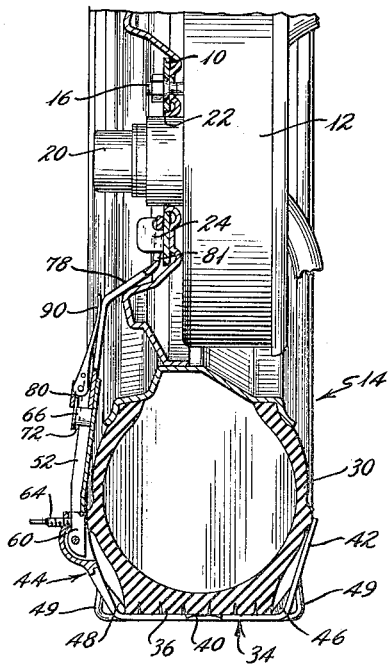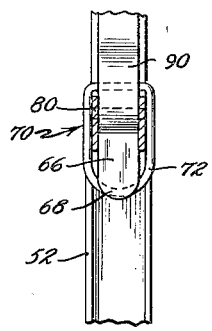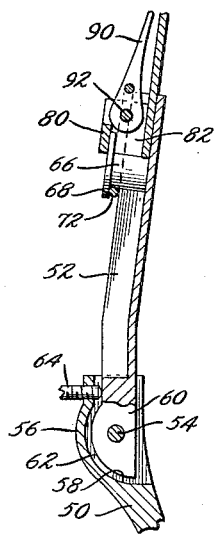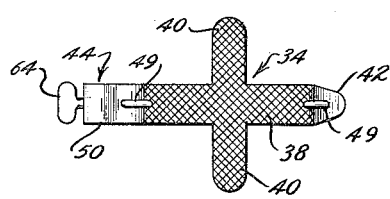

United States Patent Office 3,045,738
Patented July 24, 1962

3,045,738
TRACTION DEVICE
Louis Lombardi, 54 Doremus St., Paterson, N.J.
Filed Jan. 10, 1961, Ser. No. 81,804
5 Claims. (Cl. 152—225)

The present invention relates to readily mountable and removable traction devices for vehicle wheels, and more particularly to a traction aid means which may be applied to the tire of the driven or power wheels of an automotive vehicle.

Various emergency traction devices of this general type and which do not require jacking of the car for application have been proposed. Such devices are useful in case of a vehicle being stalled in snow or mud, for instance, to enable the power wheels to obtain the needed traction to move the vehicle. The problem in these devices is to find a structure which is sturdy, dependable and securely mounted on the wheel while requiring no tools for mounting or removal as well as being economically feasible.

It is accordingly a primary object of this invention to provide an emergency traction device which may be readily installed without tools on a vehicle wheel while the wheel rests on the ground and which may be equally readily removed from the wheel when no longer needed.

It is another object of the invention to provide improved means for attaching such an emergency traction device to the wheel and to provide readily accessible means on the wheel to which the traction device may be attached.

It is also an object of the invention to provide means on the traction device for adjusting its configuration to correspond to that of a given wheel or tire on which it is mounted.

I accomplish these and other objects and advantages in accordance with my invention with a traction device comprising a generally hook-shaped traction element having a base portion generally conforming to, and adapted transversely to extend across, the tread portion of a tire to which the traction device is applied and two side portions extending from the base portion and generally conforming to the side walls of the tire. Preferably, one of the side portions of the traction element consists of two pivotally connected parts so as to permit adjustment of this one side portion in conformity with the configuration of the side wall of the tire, a set screw being mounted in one of the parts and bearing upon the other part so as to fix the adjusted parts in the desired position.

For readily mounting the traction element on the wheel, the wheel carries on its outside a lug plate provided with at least one radially extending lug. A traction element attaching member has at one end means for readily attaching the member to the lug and, at the other end, a locking means actuatable to engage a projection on the one side portion of the traction element to secure the side portion to the attaching member when the side portion of the traction element and the attaching member are in alignment. Preferably, the locking means comprises a cam lever pivotally operating a U-shaped member mounted eccentrically in relation to the fulcrum of the lever and having a bight, and a generally heel-shaped projection is mounted on the traction element side portion to be engaged by the bight of the U-shaped member upon operation of the lever whereby the attaching member and the traction element are pulled together.

In a preferred embodiment of the invention, the one part of the side portion of the traction element is a channel member where in the projection is mounted and the attaching member is of a width permitting it to glide without substantial lateral play into the channel member, the attaching member having an enlarged end portion to which the locking means is pivoted and which has a recess for receiving the projection when the attaching member glides into the channel member.

The above and other objects, advantages and features of the present invention will be more fully understood when considered in connection with the following detailed description of presently preferred embodiments thereof, taken in conjunction with the accompanying drawing wherein:

FIGURE 1 is an exploded perspective view of a traction device according to the invention;

FIGURE 2 is a perspective view of the invention applied to an automobile wheel;

FIGURE 3 is a perspective view of the elements shown in FIGURE 1 assembled and positioned on a tire that is shown in phantom lines;

FIGURE 4 is an axial sectional view of the traction device shown in FIGURES 1 and 3 positioned on a standard automobile wheel;

FIGURE 5 is a fragmentary sectional view on the line 5—5 in FIGURE 3;

FIGURE 6 is a fragmentary sectional view on the line 6—6 in FIGURE 3;

FIGURE 7 is a bottom view of the base portion of the traction device illustrated in FIGURES 1 to 6;

FIGURE 8 is a transverse sectional view on the line 8—8 in FIGURE 1; and,

FIGURE 9 is a fragmentary perspective view of a modified form of traction device according to the invention adapted for double-tired truck wheels.

Following is a description of the physical embodiment of the invention illustrated in FIGURES 1 to 8.

As seen in the drawings, wherein like reference numerals designate like parts in all figures, lug plate 10 is permanently mounted on the drum 12 of an automotive wheel 14 by means of a plurality of bolts 16 which pass through suitably spaced apertures 18 of the lug plate 10. The lug plate 10 is annular so that the wheel axle 20 may pass through the center hole 22 of the plate. The lug plate must be strong enough to resist the stresses imposed upon it by the loads it sustains when the traction elements of this invention are attached thereto. Steel plate of suitable thickness has been found useful for this purpose.

For securing the road-engaging portions of the traction device to the wheel, the lug plate 10 carries a plurality of radially-extending lugs 24, each lug being hook-shaped, as shown in FIGURES 1 and 3. In the illustrated embodiment, the lugs 24 are centered between adjacent bolts 16 but it will be clearly understood that as many lugs can be provided as required to attach a corresponding number of road-engaging portions to the wheel. If desired, only one such lug need be provided. The lugs are suitably also of steel and are affixed to the lug plate, for instance by welding.

As best seen in FIGURES 1 and 3, the portions of the traction device which engage the tire 30 and the ground or road include a generally hook-shaped traction element 32 which is also preferably made of steel and which includes a base portion 34 generally conforming to, and transversely extending across, the tread portion 36 (see FIG. 4) of the pneumatic tire 30 mounted on the wheel 14. As shown in FIG. 7, the outside surface 38 of the traction element base portion 34 is preferably roughened or milled so as to improve its frictional engagement with the ground and thus to increase traction.

The traction area is increased and added stabilization is imparted to the traction element by providing the base portion 34 with transverse extensions 40 arranged centrally of the element. Two side portions 42 and 44 extend from the base portion 34 and generally conform to the side walls of the tire 30, as seen in FIG. 4. The side portions 42 and 44 of the traction element 32 extend upwardly from the base portion 34 for a sufficient distance to hug a portion of the tire side wall and thus to provide a firm grip on the tire. Internal gussets 46 and 48 are provided at the juncture of the base and side portions of the traction element to provide an additional reinforcement therefor and also for more securely gripping the tire. However, the gussets are relatively narrow so as to prevent damage to the tire when the traction device is applied thereto.

External protrusions 49 act as additional treads for affording greater friction when engaging the road, snow, or mud.

One side portion 44 of the traction element 32 consists of leg 50 and extension 52 which are hingedly connected by pin 54 which constitutes a pivot about which extension 52 can be rotated. For this purpose, as seen in FIGURES 4 and 6, the upper end of the leg 50 is shaped to form a housing 56 with an inner arcuate bearing surface 58 for receiving a lower end 60 of extension 52 having a corresponding or mating outer arcuate surface 62 for guiding the extension 52 during its rotation about pivot 54.

In the illustrated embodiment, the leg 50, base portion 34 and side portion 42 form an integral forged steel piece but, if desired, the portions could be connected by welding, or other suitable means.

The pivotal position of extension 52 in relation to leg 50 can be adjusted and fixed by operating winged set screw 64 threadedly received in a threaded hole in housing 56. The inner end of the set screw engages extension 52. In this manner, the hingedly-connected extension 52 of the one side portion 44 of the traction element may be suitably positioned to conform most closely to and engage, the side wall of the tire 30.

In the illustrated embodiment, side portion extension 52 is a steel channel member. A heel-shaped locking projection 66 is mounted in the channel of extension 52 and preferably is provided with a rim 68 for more secure engagement with the U-shaped locking member 70, the bight 72 of the locking member fitting the heel-shaped projection 66.

The traction element attaching member 76 connects the traction element 32 to the lug plate 10 and is also preferably made of steel. This member comprises a bar 78 having an enlarged lower end 80. The upper end of bar 78 has a slot 81 formed therein adapted to engage a lug 24 on the lug plate 10 so that the attaching member 76 is hooked to the plate 10. The enlarged lower end 80 is formed with a recess 82 adapted to receive the locking projection 66 when the attaching member 76 glides into the channel of extension 52. The bar 78 is of a width permitting gliding engagement between it and the channel of extension 52 without substantial lateral play. Projection 66 forms a mortise-and-tenon joint with recess 82 whereby secure locking of the attaching member 76 and the traction element 32 is obtained without lateral play between these traction device parts.

A cam lever 90 is pivotally mounted on pin 92 mounted in the enlarged end portion 80 of the attaching member 76. The U-shaped locking member 70 is connected to the lever 90 eccentrically in relation to pin 92.

The above-described emergency traction device operates as follows:

The lug plate 10 is permanently bolted in place on the wheel 14 so that the road-engaging portion can be readily applied in case of emergency. When it is desired to assemble a traction device on the wheel, the normally used hub cap (not shown) will be removed so as to expose the lug plate 10. Then the traction element attaching member bar 78 is readily and simply connected to the lug plate 16 by slipping slot 81 over hook-shaped lug 24.

The traction element 32 is then placed in position by pushing the base portion 34 against the tire tread 36, with side portion 42 and 44 hugging the side walls of the tire. The extension 52 and the attaching member bar 78 are brought into alignment and the enlarged end portion 80 of the bar 78 is brought into gliding engagement with the channel of extension 52, whereby locking projection 66 and recess 82 automatically form a mortise-and-tenon joint. In this position, bar 78 is securely held against lateral displacement in relation to extension 52. The traction element and attaching member form a unit.

With the U-shaped locking member 70 looped over locking projection 66 and its bight 72 under the rim 68 of the locking projection 66, cam lever 90 is now pivoted upwardly to push loop 72 against projection 66, whereby bar 78 and extension 52 are securely locked together, the traction element base portion 34 being pulled into tight engagement with the tire tread 36.

Thus, without any tools and in a very simple manner, an emergency traction device may be readily mounted on a wheel and most securely attached thereto. Further improvement of the secure grip of the traction element on the tire is obtained by suitably adjusting the set screw 64 so that the extension 52 is pivoted into gripping engagement with the side wall of the tire.

Any desired number of the traction elements 32 can be mounted on the wheel in a like manner as above described, with each traction element attaching member extending radially from the hub of the wheel and connected to a traction element that extends transversely across the trend portion of the tire.

When the device is no longer needed, it may be as readily detached as it was mounted, merely by depressing lever 90, whereby bar 78 and extension 52 will be unlocked and readily removed from lug 24 and the tire, respectively.

FIGURE 9 illustrates the traction device of the present invention in an embodiment adapted for double-tire trucks. The extension 52, lug plate 10 and traction element attaching member 76 are constructed similarly to the constructions shown in FIGURES 1 to 8. In this modification, the traction element includes two like base portions 100 and 102 for engagement wtih the tread portions of the two tires mounted on a truck wheel. The two base portions are interconnected by a bridge piece 104 between two side portions 106 and 108. Another side portion 110, similar to side portion 42 of FIGURE 1, is provided to hug the inside side wall of the double-tire. In all other respects, the embodiment of FIGURE 9 is similar to that of FIGURES 1 to 8 and like parts bear the same reference numerals.

While the invention has been described in connection with two preferred embodiments, it will be clearly understood that many modifications and variations may occur to the skilled in the art without departing from the spirit and scope of this invention as defined in the appended claims.

I claim:

1. A traction device for ready mounting on, and detachment from, a wheel having a tire with a tread portion and two side walls, said traction device comprising a generally hook-shaped traction element having a base portion adapted generally to conform, and transversely to extend across, the tread portion of the tire, said traction element having two side portions extending from the base portion and adapted generally to conform to the side walls of the tire; a lug plate for mounting on the wheel; at least one lug carried by said lug plate and extending from said lug plate; a traction element attaching member for releasably attaching said traction element in tight position on a tire; means on one end of the attaching member for releasably connecting said attaching member to said lug; means for releasably connecting the opposite end of said attaching member to one side portion of said traction element, said connecting means releasably engaging said side portion and pulling said traction element toward said attaching member so as to produce a firm engagement of said traction element with the tread of the tire, said traction element and attaching member being separate parts so that each can be separately positioned on the wheel and tire without encumbrance by the other and subsequently the two can be connected together, and so that the two parts can be disconnected from each other and subsequently detached from the wheel and tire without encumbrance by the other.

2. A traction device for ready mounting on, and detachment from, a wheel having a tire with a tread portion and two side walls, said traction device comprising a generally hook-shaped traction element having a base portion adapted generally to conform to, and transversely to extend across, the tread portion of the tire, said traction element having two side portions extending from the base portion and adapted generally to conform to the side walls of the tire, one said side portion having a channel-shaped cross section at its upper end, a traction element attaching member for releasably attaching said traction element in tight position on a tire, said attaching member being shaped to be received in the channel of said one side portion; a projection extending from said one side portion adjacent its upper end; one end of the attaching member having a recess formed therein for receiving the projection when said attaching member is connected to said one side portion to provide a secure locking of the attaching member and the traction element with a minimum of lateral play; a cam lever pivotally mounted at said one end of said attaching member; a locking member pivotally connected to said lever at a position spaced from the pivotal axis of said lever, said locking member having a bight formed at its outer end, said lever being pivotable between an open position where said bight of said locking member can be placed around said projection and a closed position where said locking member is pulled away from said traction element whereby said bight exerts a pull on said projection to lock said attaching member to said traction element.

3. A traction device for ready mounting on, and detachment from, a wheel having a tire with a tread portion and two side walls, said traction device comprising a generally hook-shaped traction element having a base portion adapted generally to conform to, and transversely to extend across, the tread portion of the tire, said traction element having two side portions extending from the base portion and adapted generally to conform to the side walls of the tire, one said side portion including a leg integral with said base portion and an extension pivotally connected to the upper end of said leg, said leg having a housing formed at its upper end with an inner arcuate surface, said extension having an end pivotally received in said housing, said extension end having an outer arcuate surface mating with said leg inner arcuate surface so that said extension is guided in its pivotal movement, a set screw threadly received in said housing and engaging said extension at a point spaced from the pivotal axis of said extension whereby adjustment of said set screw can change the orientation of said leg and said extension to adjust the shape of the traction device to accommodate various wheels and tires, said extension having a channel-shaped cross section, said extension having a generally-heel-shaped projection adjacent its upper end; a traction element attaching member shaped to be received in the channel of said extension; means for connecting one end of said attaching member to a wheel; the opposite end of the attaching member having a recess formed therein for receiving said generally-heel-shaped projection when said attaching member is connected to said extension to provide a secure locking of the attaching member and the traction element with a minimum of lateral play; a cam lever pivotally mounted at the lower end of said attaching member; a locking member pivotally connected to said lever at a position spaced from the pivotal axis of said lever, said locking member having a bight formed at its outer end, said lever being pivotable between a lower open position where said bight of said locking member can be placed around said generally-heel-shaped projection and an upper closed position where said locking member is pulled away from said traction element whereby said bight exerts a pull on said projection to lock said attaching member to said traction element, and firmly engage the traction element with the tire tread, said traction element and attaching member being separate parts so that each can be separately positioned on the wheel and tire without encumbrance by the other and subsequently the two can be connected together, and so that the two can be disconnected from each other and subsequently separately detached from the wheel and tire without encumbrance by the other.

4. A traction device for ready mounting on, and detachment from, a wheel having a tire with a tread portion and two side walls, said traction device comprising a generally-hook-shaped traction element having a base portion adapted generally to conform to, and transversely to extend across, the tread portion of the tire, said traction element having two side portions extending from the base portion and adapted generally to conform to the side walls of the tire, a traction element attaching member for releasably connecting said traction element with a wheel and releasably engaging said traction element with the tread of the tire, means for connecting one end of said attaching member to a wheel; a cam lever pivotally mounted at the other end of said attaching member; a locking member pivotally connected to said lever at a position spaced from the pivotal axis of said lever, said locking member having a portion engageable with a portion of one said side portion of the traction element, said lever being pivotable between a lower open position where said locking member can be attached to a said side portion of said traction element and an upper closed position where said locking member is pulled away from said traction element whereby said locking member exerts a pull on said side portion to lock said attaching member to said traction element and pull said traction element into firm engagement with the tread of a tire, said traction element and attaching member being separate parts so that each can be separately positioned on the wheel and tire without encumbrance by the other and subsequently the two can be connected together, and the two can be disconnected from each other and subsequently separately detached from the wheel and tire without encumbrance by the other.

5. A traction device as set forth in claim 4, wherein the traction element comprises a plurality of said base portions, each to extend transversely across a respective tread portion of a plurality of tires mounted on the wheel.

References Cited in the file of this patent

UNITED STATES PATENTS

| 1,540,470 | Hayden | June 2, 1925 |
| 2,692,632 | Snedeker | Oct. 26, 1954 |

FOREIGN PATENTS

| 303,868 | Switzerland | Dec. 15, 1954 |